(12) United States Patent
Choi et al.

(10) Patent No.: US 12,047,815 B2
(45) Date of Patent: Jul. 23, 2024

(54) APPARATUS AND METHOD FOR DYNAMIC RESOURCE ALLOCATION IN CLOUD RADIO ACCESS NETWORKS

(71) Applicant: Industry-Academic Cooperation Foundation, Chosun University, Gwangju (KR)

(72) Inventors: Wooyeol Choi, Gwangju (KR); Reheunuma Tasnim Rodoshi, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 444 days.

(21) Appl. No.: 17/487,516

(22) Filed: Sep. 28, 2021

(65) Prior Publication Data

US 2022/0116823 A1 Apr. 14, 2022

(30) Foreign Application Priority Data

Oct. 8, 2020 (KR) .................. 10-2020-0129919

(51) Int. Cl.
*H04W 28/08* (2023.01)
*H04W 28/02* (2009.01)
*H04W 72/52* (2023.01)

(52) U.S. Cl.
CPC ... *H04W 28/0942* (2020.05); *H04W 28/0284* (2013.01); *H04W 72/52* (2023.01)

(58) Field of Classification Search
None
See application file for complete search history.

(56) References Cited

U.S. PATENT DOCUMENTS

| | | | | |
|---|---|---|---|---|
| 11,614,976 B2* | 3/2023 | Ramanathan | ......... | G06F 9/5077 |
| | | | | 718/1 |
| 2019/0363990 A1 | 11/2019 | Lorenz et al. | | |
| 2020/0382975 A1* | 12/2020 | Jo | ......... | H04W 28/16 |
| 2022/0329539 A1* | 10/2022 | Kim | ......... | H04L 41/147 |
| 2023/0123083 A1* | 4/2023 | Huangfu | ......... | H03M 13/6597 |
| | | | | 341/61 |

FOREIGN PATENT DOCUMENTS

KR   10-1883599 B1   8/2018

OTHER PUBLICATIONS

An Office Action mailed by the Korean Intellectual Property Office on Apr. 28, 2022, which corresponds to Korean Patent Application No. 10-2020-0129919 and is related to U.S. Appl. No. 17/487,516.
Decision of Refusal mailed by the Korean Intellectual Property Office on Aug. 10, 2022, which corresponds to Korean Patent Application No. 10-2020-0129919 and is related to U.S. Appl. No. 17/487,516.

* cited by examiner

*Primary Examiner* — Mohammad S Adhami
(74) *Attorney, Agent, or Firm* — Studebaker & Brackett PC

(57) ABSTRACT

Disclosed is an apparatus for dynamic resource allocation in cloud radio access networks, and the dynamic resource allocation apparatus includes: a deep reinforcement learning unit learning load fluctuation of a remote radio head by using deep reinforcement learning and predicting the load fluctuation of the remote radio head; a calculation unit calculating a computational resource of a virtual machine corresponding to the remote radio head by using the predicted load fluctuation; and an allocation unit allocating the calculated computational resource to the virtual machine.

5 Claims, 6 Drawing Sheets

Algorithm 1 DRL based resource allocation framework
---
1: Initialize replay memory $E$ with capacity $\mathcal{E}$, main network weights $\theta$, target network weights $\theta' = \theta$ and mini-batch size $L$
2: Pre-train DNN with input pairs $(S, A)$, corresponding main network action-value function $Q(S, A; \theta)$ and target network action-value function $Q(S, A; \theta')$
3: Save the trained network and its corresponding experience in replay memory $E$
4: for episode $k \in 1, 2, \ldots, K$ do
5:     for $t \in 1, 2, \ldots, T$ do
6:         Get the network state $S_t$ from the dataset
7:         With probability $\epsilon$, select a random action $A_t$
8:         Otherwise, select $A_t = \mathrm{argmax}_{A_t} Q(S_t, A_t; \theta)$
9:         Execute action $A_t$
10:        Observe reward $R_t$ and next state $S_{t+1}$
11:        Store state transition $(S_t, A_t, R_t, S_{t+1})$ in $E$
12:        Sample mini-batch of $L$ transitionssection from $E$
13:        Set $\phi_t = \begin{cases} R_t & \text{for terminal state } S_{t+1} \\ R_t + \gamma \max_{A'_t} Q(S_{t+1}, A'_t; \theta') & \text{o.w.} \end{cases}$
14:        Update $\theta$ by performing a gradient descent on $(\phi_t - Q(S_t, A_t; \theta))^2$
15:     end for
16:     Update target network weights $\theta' = \theta$
17: end for

APPARATUS AND METHOD FOR DYNAMIC RESOURCE ALLOCATION IN CLOUD RADIO ACCESS NETWORKS

CROSS-REFERENCE TO RELATED APPLICATIONS

This application claims the priority of Korean Patent Application No. 10-2020-0129919 filed on Oct. 8, 2020, in the Korean Intellectual Property Office, the disclosure of which is incorporated herein by reference.

BACKGROUND OF THE INVENTION

Field of the Invention

The present invention relates to an apparatus and a method for dynamic resource allocation in cloud radio access networks, and more particularly, to an apparatus and a method for dynamic resource allocation based on deep reinforcement learning.

Description of the Related Art

Cloud radio access networks (CRAN) are an architecture which can satisfy a resource demand which seamlessly increases in a communication network. In the C-RAN, a base station is separated into a baseband unit and a remote radio head. The baseband unit is further centralized and virtualized to a virtual machine in a baseband unit pool. Accordingly, the C-RAN can satisfy a traffic demand of cellular data which significantly increases.

However, due to characteristics that resource management of the C-RAN is operated for a long time, the resource management should be carefully designed in order to meet user needs. Since the user needs are very diversely changed according to a time and a place, it is difficult to perform optimal resource management.

SUMMARY OF THE INVENTION

The present invention is contrived to improve such a problem, and has been made in an effort to provide a device and a method for allocating a dynamic resource using a deep reinforcement learning model because resource allocation is performed according to a quantity of resources required in a related remote radio head (RRH) of a virtual machine.

The present invention has been made in an effort to provide a method for learning space and time user demands of the C-RAN by using the deep reinforcement learning model and adjusting a size of a virtual machine (VM) in order to allocate a computational resource into a baseband unit (BBU) pool. The allocation of the computational resource can be performed according to the quantity of resources required for a remote radio head associated with the virtual machine.

According to the present invention, while user needs which are dynamically changed are met, efficiency of a C-RAN network resource can be implemented.

In order to achieve the objects, an exemplary embodiment of the present invention provides an apparatus for allocating a dynamic resource, which may include: a deep reinforcement learning unit learning load fluctuation of a remote radio head by using deep reinforcement learning and predicting the load fluctuation of the remote radio head; a calculation unit calculating a computational resource of a virtual machine corresponding to the remote radio head by using the predicted load fluctuation; and an allocation unit allocating the calculated computational resource to the virtual machine.

In the exemplary embodiment, the deep reinforcement learning unit may include a learning unit learning the load fluctuation of the remote radio head by using the deep reinforcement learning, and a prediction unit predicting the load fluctuation of the remote radio head.

In the exemplary embodiment, the deep reinforcement learning unit may acquire a reward value from the virtual machine and predict the load fluctuation of the remote radio head by using the reward value.

In the exemplary embodiment, the deep reinforcement learning unit may repeatedly perform learning until a difference value between a required value of the computational resource and an allocation value of the computational resource reaches a predetermined value or less.

In the exemplary embodiment, the deep reinforcement learning unit may learn the load fluctuation of the remote radio head by dividing a time domain and predict the load fluctuation to correspond to the time domain.

Another exemplary embodiment of the present invention provides an operation method of a dynamic resource allocation apparatus, which may include: (a) learning load fluctuation of a remote radio head by using deep reinforcement learning and predicting the load fluctuation of the remote radio head; (b) calculating a computational resource of a virtual machine corresponding to the remote radio head by using the predicted load fluctuation; and (c) allocating the calculated computational resource to the virtual machine.

In the exemplary embodiment, the method may further include (d) acquiring a reward value from the virtual machine and predicts the load fluctuation of the remote radio head by using the reward value.

In the exemplary embodiment, the predicting of the load fluctuation of the remote radio head by using the reward value may be repeatedly performed until a difference value between a required value of the computational resource and an allocation value of the computational resource reaches a predetermined value or less.

In the exemplary embodiment, when there are plurality of virtual machines, the difference value may be calculated by adding absolute values of required values of the computational resources for respective virtual machines and the allocation value of the computational resource.

In the exemplary embodiment, in the predicting of the load fluctuation, the load fluctuation of the remote radio head may be learned by dividing a time domain and the load fluctuation may be predicted to correspond to the time domain.

Since an apparatus for dynamic resource allocation in cloud radio access networks learns a user demand by using deep reinforcement learning, a dynamic resource allocation method capable of enhancing network resource efficiency can be implemented.

BRIEF DESCRIPTION OF THE DRAWINGS

FIG. 4 illustrates a deep reinforcement learning algorithm of a dynamic resource allocation apparatus according to an exemplary embodiment.

DETAILED DESCRIPTION OF THE PREFERRED EMBODIMENT

Figure 1:
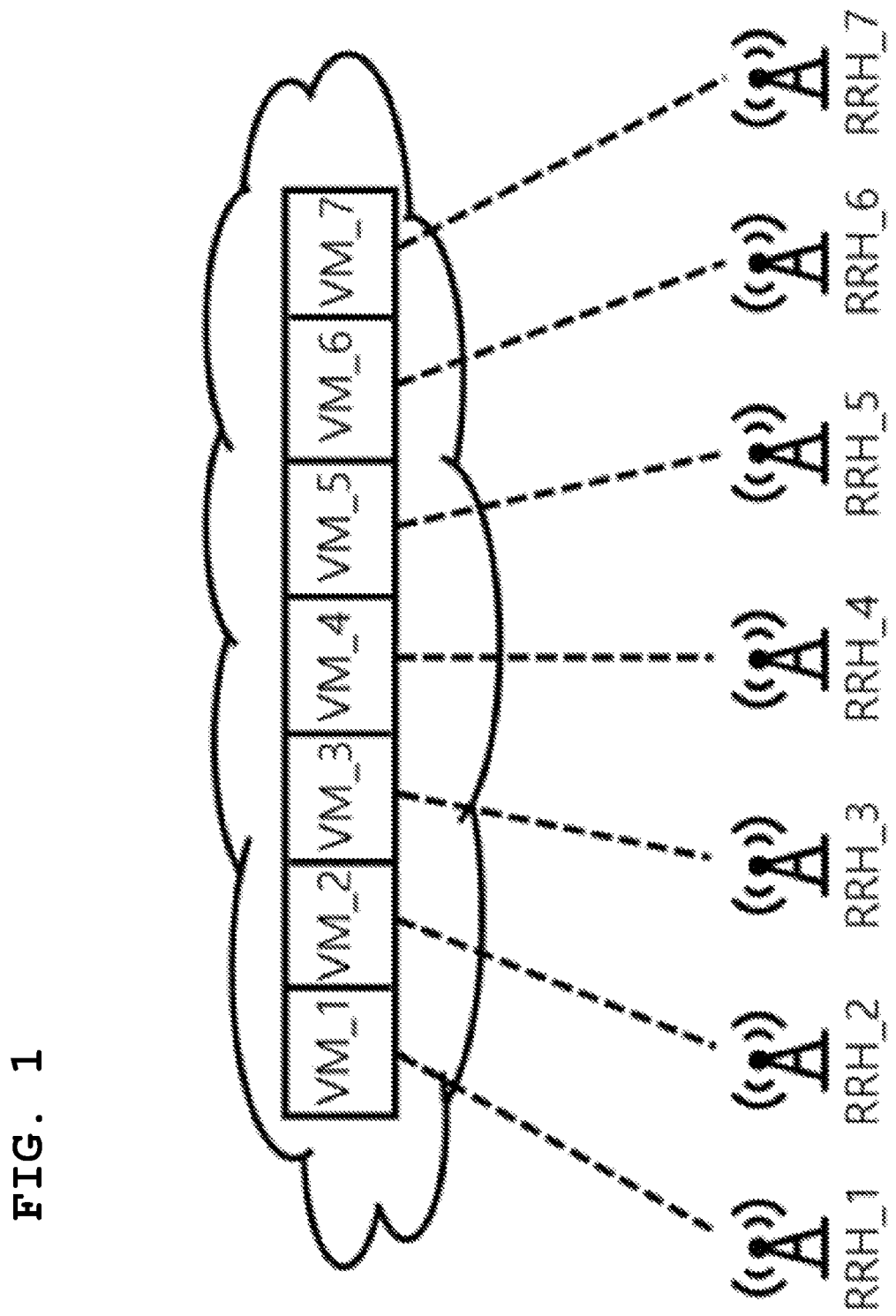
FIG. 1 is a conceptual diagram for cloud radio access networks according to the present invention.

Hereinafter, an apparatus for dynamic resource allocation in cloud radio access networks according to an exemplary embodiment of the present invention will be described. A method for manufacturing a low friction member according to an exemplary embodiment of the present invention will be described in detail with reference to the accompanying drawings. However, this does not limit the present invention to specific exemplary embodiments, and it should be understood that the present invention covers all the modifications, equivalents and replacements included within the idea and technical scope of the present invention. In describing each drawing, reference numerals refer to like elements. In the accompanying drawings, sizes of structures are illustrated to be larger than those of real structures to make the clarity of the present invention.

Terms including as first, second, and the like are used for describing various components, but the components should not be limited by the terms. The terms are used only to discriminate one component from another component. For example, a first component may be referred to as a second component, and similarly, the second component may be referred to as the first component without departing from the scope of the present invention.

Terms used in the present application are used only to describe specific exemplary embodiments, and are not intended to limit the present invention. A singular form includes a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

An apparatus and a method for dynamic resource allocation in cloud radio access networks according to an exemplary embodiment of the present invention will be described.

A general radio access network may include a baseband unit (BBU) and a remote radio head (RRH) in a base station. Specifically, the remote radio head means a radio frequency division selecting and receiving only data required for waiting in a mobile communication base station system. In addition, the baseband unit means a division that decrypts the received data.

On the contrary, a cloud radio access network (C-RAN) separates a baseband unit (BBU) and a remote radio head (RRH) among functions of the base station. In the cloud radio access network, an individual base station includes the remote radio head, and may include the baseband unit in a form of a virtual machine in a cloud. That is, the individual base station does not include the baseband unit, but may include a corresponding baseband unit in which the cloud corresponds to each individual base station by using cloud computing and virtualization technology, and as a result, the individual base stations may be centralized to a point such as a cloud data center.

In an exemplary embodiment, a function of the baseband unit may be implemented as a virtual machine (VM) in the centralized data center. When the architecture is used, computational resources such as a CPU, a memory, and a storage may be efficiently managed, and energy consumption and cost may be reduced.

Meanwhile, as the numbers of tablets and computers connected to an Internet of Things (IoT) device and the Internet increase, mobile data traffic significantly increases. In particular, in a cellular network, traffic patterns of different cells are very dynamically changed at different times and locations.

That is, a required quantity of computational resources of the baseband unit corresponding to the remote radio head varies depending on a user required quantity connected to the remote radio head. In addition, operation efficiency of the remote radio head connected to the baseband device varies depending on the computational resource allocated to the baseband device.

Specifically, when computational resources which are excessively larger than a quantity required in the remote radio head are allocated to the baseband device, the resources may be wasted. On the contrary, when computational resources which are smaller than the quantity required in the remote radio head are allocated to the baseband device, the resources may be insufficient and the traffic may be generated. Further, the baseband device in which the computational resources are insufficient may be overloaded.

Using more resources is required to process dynamic traffic. However, since a capacity of the existing mobile network and available resources are limited, it is not sufficient to process data traffic of a tremendous amount while meeting quality of service requirements of the user. Moreover, a change of the traffic pattern due to user mobility makes it difficult to efficiently use base station resources of the existing radio access network (RAN).

Accordingly, a method will be described, which may efficiently manage a dynamic load by reserving or managing resources in a central scheme in the baseband unit pool by using a centralized architecture of the cloud radio access network according to an exemplary embodiment.

Referring to FIG. 1, a cloud radio access network according to an exemplary embodiment of the present invention may include at least one remote radio head and a virtual machine connected to the remote radio head.

A general C-RAN architecture is considered, in which there are K cells, and one remote radio head (RRH) is provided in each cell. $H=\{h_1, h_2, \ldots, h_M\}$ represents a set of remote radio heads of a network, and here, M represents the number of remote radio heads. $U=\{u_1, u_2, \ldots, u\ N\}$ represents a user set. Here, N represents the maximum number of users of each remote radio head.

Each remote radio head is connected to the virtual machine in the baseband unit pool. Here, $V=\{v_1, v_2, \ldots, v_M\}$ represents a set of the virtual machines. Since one remote radio head is connected only to one virtual machine of the baseband unit pool, the number of remote radio heads and the number of virtual machines are equal to each other.

In FIG. 1, a case where each of the number of virtual machines of the baseband unit pool and the number of remote radio heads is 7 is exemplarily illustrated. Each BS includes the remote radio head, and a cloud may include respective virtual machines corresponding to the remote radio heads. At least one virtual machine performing a function of the baseband unit is included in one cloud. A plurality of virtual machines included in the one cloud may be appreciated as the baseband unit pool. In some cases, it is also possible that one cloud includes a plurality of baseband unit pools.

In a real-time cellular communication network, a data load in each remote radio head is changed according to a time due to mobility of a user. The amount of computational resources required for each virtual machine also varies depending on the load.

Accordingly, a dynamic resource allocation apparatus based on deep reinforcement learning allocates the resource to each virtual machine based on a required resource. A total of computational resources required for the baseband unit pool are a sum of computational resources required in all virtual machines of the baseband unit pool, and may be used as follows.

$$S = \sum_{i=1}^{M} \sum_{j=1}^{N} l_{hi,uj}$$

Here, $l_{hi,uj}$ represents a traffic load of a j-th user in the cell, which is connected to an i-th remote radio head. A total quantity of resources allocated to the baseband unit pool may be calculated as follows.

$$A = \sum_{i=1}^{M} a_i$$

Here, $a_i$ represents a resource allocated to an i-th virtual machine.

Since $B_{max}$ which is a maximum capacity limit of the baseband unit pool is fixed, A which is a maximum capacity as the total quantity of the allocated resources may exceed $B_{max}$ ($A<B_{max}$). Resources which remain after allocating the resources are stored in the baseband unit pool. A total quantity of saved resources $\delta$ may be written as $\delta=B_{max}-A$.

Further, when the dynamic resource allocation apparatus allocates more resources than the required quantity to the baseband unit pool, some resources may be wasted. The quantity resources wasted in the i-th virtual machine may be written as follows.

$$w_i = a_i - \sum_{j=1}^{N} l_{hi,uj}$$

When the dynamic resource allocation apparatus allocates less resources than the required resources, a user demand which is not satisfied increases. In an i-th remote radio head, a demand quantity of N users which is not satisfied (is insufficient) may be defined as follows.

$$\mu_i = \sum_{j=1}^{N} (l_{hi,uj} - d_{hi,uj})$$

Here, $d_{hi}$,uj represents a satisfied demand of a j-th user in a cell connected to the i-th remote radio head.

The dynamic resource allocation apparatus according to an exemplary embodiment may allocate the resources in a scheme of minimizing the wasted resources and the user demand which is not satisfied.

Figure 2:
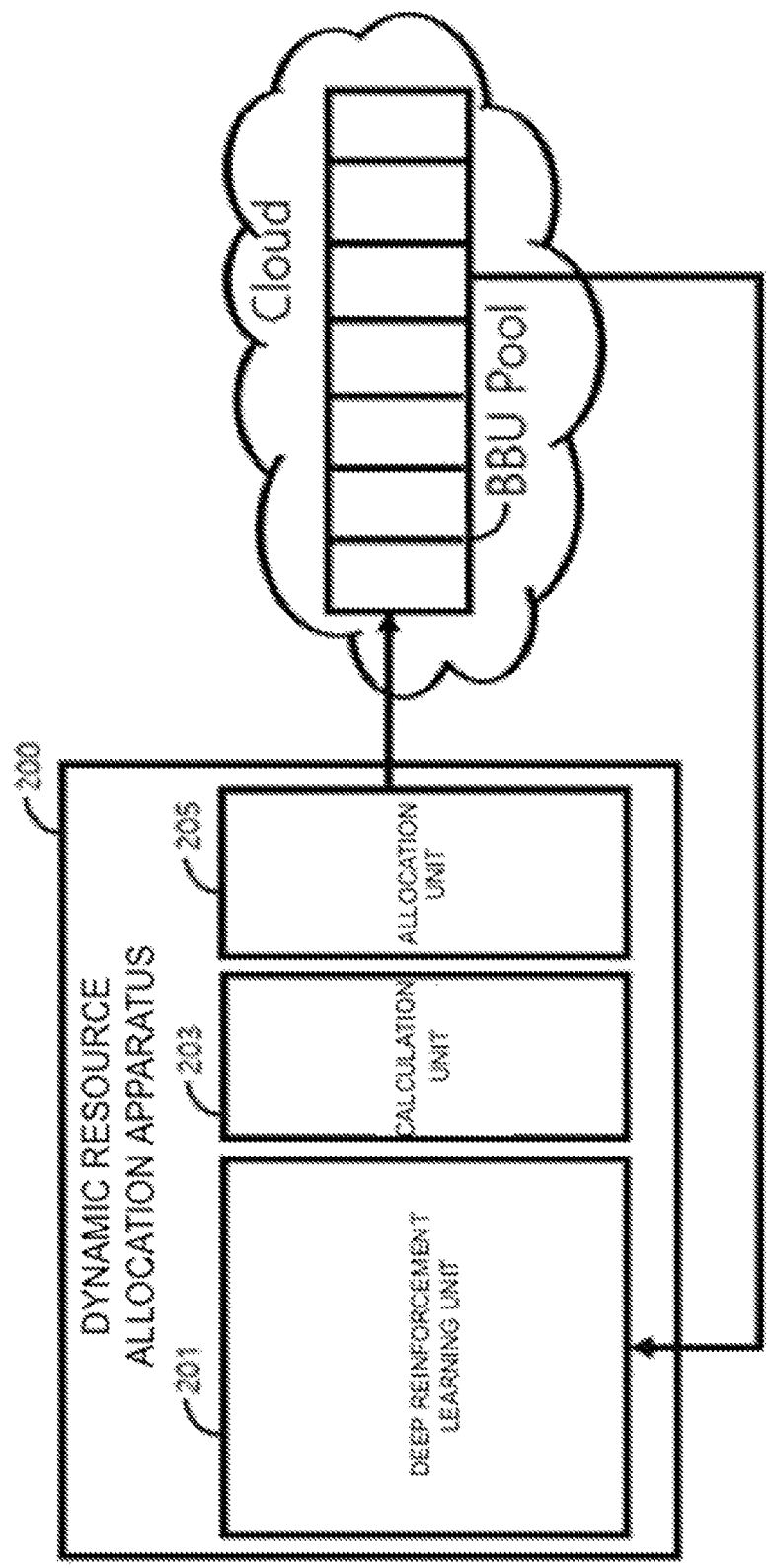
FIG. 2 is a conceptual diagram for a dynamic resource allocation apparatus performing deep reinforcement learning.

FIG. 2 is a conceptual diagram for a dynamic resource allocation apparatus performing deep reinforcement learning in cloud radio access networks.

The baseband unit (BBU) pool may include at least one virtual machine performing a function of the baseband unit (BBU), and a traffic load in the baseband unit pool may vary depending on all remote radio heads connected to individual virtual machines. The dynamic resource allocation apparatus may bring loads of all remote radio heads. That is, since all remote radio heads are connected to the same baseband unit pool, load information of all remote radio heads may be processed in one centralized processor.

The dynamic resource allocation apparatus may determine to adjust a size of the virtual machine and allocate the resource to each virtual machine according to the quantity of computational resources required for each virtual machine in order to process the load of the remote radio head connected by using the load information of the remote radio head. Further, a resource reward of the dynamic resource allocation apparatus may be acquired according to a performed action.

Specifically, a deep reinforcement learning unit 201 may learn load fluctuation of the remote radio head. The traffic load in each cell of the network varies depending on which time in a day. Therefore, the deep reinforcement learning unit 201 may learn the load fluctuation according to a varied time change.

In other words, there are required resources at a time when a usage is large and resource requirements are low according to a user load when the usage is small. The deep reinforcement learning unit may acquire and learn information on traffic load of each cell corresponding to each time in a day.

Next, a calculation unit 203 may calculate a quantity of required computational resources of the virtual machine. Specifically, the calculation unit 203 may calculate the quantity of required computational resources of the virtual machine in response to the load fluctuation learned by the deep reinforcement learning unit 201. Further, it is also possible to calculate a quantity which should be increased or decreased as compared with the quality of computational resource allocated at present.

Last, an allocation unit 205 performs an allocation assignment to each virtual machine according to the calculated resources. The computational resources allocated at present may be increased or decreased, and maintained.

Meanwhile, the dynamic resource allocation apparatus may continuously repeatedly learn the load fluctuation in order to meet user needs. A reward value is acquired from the virtual machine, and the model is continuously learned while reflecting the reward value to further increase resource allocation efficiency.

Therefore, the dynamic resource allocation apparatus may allocate the resource to each virtual machine based on the learned model while predicting the quantity of required resources in advance.

Figure 3:
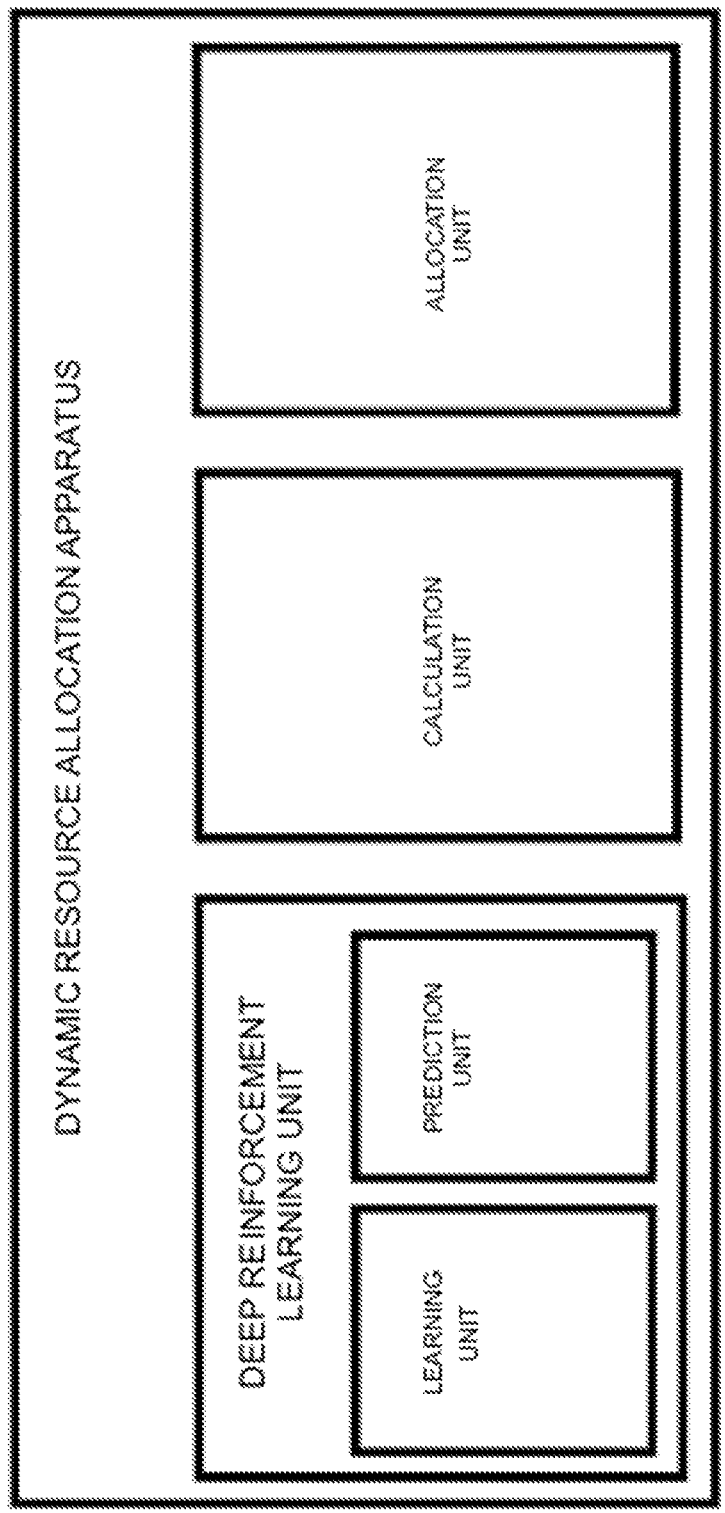
FIG. 3 is a conceptual diagram for another dynamic resource allocation apparatus performing deep reinforcement learning.

FIG. 3 is a conceptual diagram for another dynamic resource allocation apparatus performing deep reinforcement learning according to an exemplary embodiment. In FIG. 3, a detailed configuration and a learning and allocation process of the dynamic resource allocation apparatus will be together described in detail.

First, deep reinforcement learning (DRL) as a combination of reinforcement learning (RL) and a deep neural network may provide an efficient and effective access scheme that enhances an existing reinforcement learning algorithm. That is, the DRL is a learning method that performs end-to-end reinforcement learning by utilizing a function to extract a useful function directly in a high-dimension state space of the deep neural network. In the present specification, a basic theory of the deep reinforcement learning is not deeply described, and may be understood by referring to R. S. Sutton and A. G. Barto, Reinforcement Learning, Second Edition: An Introduction—Complete Draft, 2018. or I. Goodfellow, Y. Bengio, and A. Courville, Deep learning. MIT press.

The deep reinforcement learning unit according to an exemplary embodiment may include a learning unit and a prediction unit. The learning unit of the deep reinforcement learning unit of the dynamic resource allocation apparatus acquires state information associated with the user load.

In addition, the learning unit calculates an approximate value of a Q value when performing an assignment. The assignment may mean an assignment that allocates the computational resource to the virtual machine exemplarily, but not limitedly.

Thereafter, an assignment A having a maximum Q value is selected among all available assignment sets of a specific state. The deep reinforcement learning unit receives a reward value R in each learning after the assignment A is selected. The learning unit learns an assignment performing method based on the reward value R.

Further, the learning unit may repeat the learning until the reward value reaches a desired target value. The target value may be, for example, a difference between a computational resource allocation value corresponding to the user load in a current state and an actually required computational resource value. That is, the learning may be repeated until the difference between the computational resource allocation value corresponding to the user load in the current state and the actually required computational resource value is equal to or less than a pre-designated value.

The prediction unit may predict a next state based on the learned contents. Specifically, the following state information associated with a user load in a subsequent interval may be predicted by using the learned state information and reward value.

Accordingly, in the deep reinforcement learning unit, the prediction unit may prediction a user load of a subsequent interval by using repeated learning of the learning unit.

Next, the dynamic resource allocation method according to an exemplary embodiment will be described in detail.

Since the user load of the data set is included in each state A, a state value is consecutive. In this case, a state space and an action space will become infinite. Therefore, in order to acquire a finite state space, a state value may be discrete by acquiring a maximum load and a minimum load in the data set.

Then, the state value is divided by a predetermined number to acquire a state cluster. The number of states may vary depending on a random number selected by the user. In the dynamic resource allocation method, each of the state, the assignment, and the reward will be described below.

State set—{S}: The state of the dynamic resource allocation apparatus is a set of resources required for all virtual machines of the baseband unit pool at each moment. The set may include all state values of the network. One state which is an element of the set is used as an input of the deep reinforcement learning unit.

Assignment set—{A}: The computational resource is allocated to each virtual machine of the baseband unit pool by performing the assignment. The dynamic resource allocation apparatus allocates the resource according to the total quantity of the resources allocated to the baseband unit pool based on a total of required computational resources provided to the state.

Accordingly, the assignment set {A} means all available assignment resource sets which the dynamic resource allocation apparatus may take for allocation by the assignment A. Each assignment A indicates the total quantity of resources allocated to all virtual machines.

Reward set—{R}: After the assignment is performed, an immediate reward value is transferred to the deep reinforcement learning unit according to the assignment. Here, the immediate reward value may be defined as follows.

$$R = \delta \times \sum_{i=1}^{M} \sum_{j=1}^{N} d_{hi,uj}$$

Here, δ represents the total quantity of saved resources in the baseband unit pool, and when specifically described, δ may mean a value acquired by subtracting A which is the total quantity of resources allocated in the maximum capacity $B_{max}$ of the baseband unit pool, i.e., B.

Here, $d_{hi}$,uj represents a satisfied demand of a j-th user in a cell connected to the i-th remote radio head and σ represents cost related to the quantity of saved resources. The dynamic resource allocation apparatus may use the reward set {R} including all reward values.

The dynamic resource allocation apparatus is presented, which performs the deep reinforcement learning based on the state, action, and reward. In an exemplary embodiment, two neural network are used for enhancement of performance, and one neural network may be used as a main network and the other one may be used as a target network.

FIG. 4 illustrates an algorithm of allocating a dynamic resource in the cloud radio access network.

First, E of a regenerative memory having a capacity ε, a weight θ of the main network, a weight θ' of the target network which is equal to a value of θ, and a size L of a miniature arrangement are initialized.

The DNN may determine a correlation of respective state-assignment pair (S, A) in a cloud radio access network environment. The DNN takes computational resources required for all virtual machines given in each state, and outputs an assignment value function Q (S,A;θ) in order to perform the assignment A in the state S. Here, S∈{S} and A∈{A}. A target network assignment value function Q(S, A;θ') is initialized to the weight θ' of the target network. The DNN learns all states according to the process and a state switching sample is stored in the regenerative memory E.

In each episode k∈1, 2, . . . , K, the deep reinforcement learning may be repeated at t∈1, 2, . . . , T times. In each repetition, one of states $S_t$ of the C-RAN user load is regarded as the state of the target network. The deep reinforcement learning unit performs an assignment $A_t$ according to an ε-greedy method. In this method, at a probability ε, the dynamic resource allocation apparatus selects a random assignment of resource allocation or selects an assignment having a highest expectation Q value. Here, $S_t$ represents a current state, and $A_t$ as an operation of providing a maximum reward in the corresponding state means allocating a resource quantity to each virtual machine of maximizing the reward. θ represents a weight of the learned DNN.

The dynamic resource allocation apparatus performs the assignment, and then acquires an immediate reward value $R_t$ and a subsequent state $S_{t+1}$. A state transition $(S_t, A_t, R_t, S_{t+1})$ is stored in the regenerative memory E. A random miniature arrangement of the state transition is sampled from the regenerative memory. In the algorithm, $\varphi_t$ acquired from $R_t$ and a discount coefficient γ is a target value for taking the action $A_t$ in the state $S_t$. The assignment selection varies depending on the weights θ and θ' of the main network used for evaluating the assignment value. In each repetition, a loss function is calculated from the $\varphi_t$ value and the assignment value. Then, the loss function is back-propagated to update θ' when each determination epoch ends according to the θ value.

By using the dynamic resource allocation method according to an exemplary embodiment, the computational resources may be efficiently allocated to the respective virtual machines.

Figure 5:
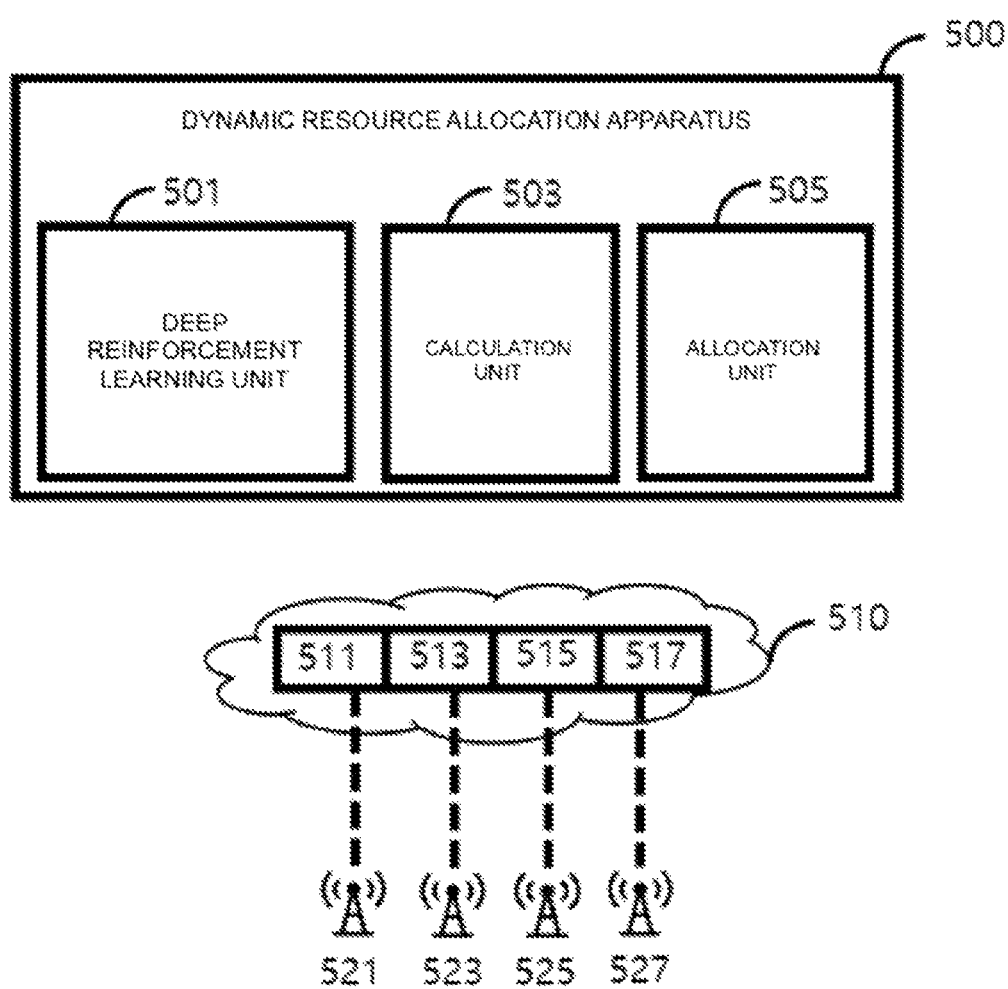
FIG. 5 is a conceptual diagram for a method in which a dynamic resource allocation apparatus operates in cloud radio access networks.

FIG. 5 is a conceptual diagram for a method in which a dynamic resource allocation apparatus operates in cloud radio access networks. In FIG. 5, a method in which the dynamic resource allocation apparatus operates in the cloud radio access network will be described as a whole.

The cloud radio access network according to an exemplary embodiment may be constituted by a cloud 510 and a base station 520. The base station 520 may be constituted by a plurality of base stations. In FIG. 5, four individual base stations 521, 523, 525, and 527 are exemplarily illustrated. Each of the individual base stations 521, 523, 525, and 527 may include only a radio remote radio head (RRH) without the baseband unit.

The cloud 510 may include a plurality of virtual machines 511, 513, 515, and 517 corresponding to the individual base stations. The virtual machine may serve as the baseband unit to correspond to the remote radio head. Further, exemplarily, but not limitedly, the plurality of virtual machines may correspond to the remote radio heads 1:1.

The dynamic resource allocation apparatus 500 may allocate computational resources to the plurality of virtual machines 511, 513, 515, and 517 in the illustrated cloud radio access network. Specifically, the dynamic resource allocation apparatus 500 may include a deep reinforcement learning unit 501, a calculation unit 503, and an allocation unit 505.

Here, the deep reinforcement learning unit may acquire user load information of the corresponding remote radio head from each virtual machine of the cloud as state information. The deep reinforcement learning unit may perform the deep reinforcement learning by using the acquired state information and predict subsequent state information based on the learning.

The calculation unit 503 may calculate the computational resource to be allocated to the virtual machine by using the predicted state information. Specifically, since the predicted state information is a value acquired by predicting the user load in a subsequent interval, the computational resource to be allocated to the virtual machine may be calculated to correspond to the predicted user load.

The allocation unit 505 allocates the calculated computational resource to the virtual machine. Exemplarily, but not limitedly, the Q function value is allocated to allocate the computational resource to the virtual machine. Further, as compared with the computational resource already allocated to the virtual machine, the computational resource in a current step may be increased, decreased, or maintained.

When a new computational resource is allocated by the allocation unit 505, the deep reinforcement learning unit 510 may acquire the immediate reward value from the virtual machine. The deep reinforcement learning unit 510 may perform learning again by using the acquired reward value and predict the state information again.

The above-described process may be repeatedly performed until a specific target value is reached. Since the target value is described in detail in FIGS. 2 and 3, the target value is not repeatedly described.

Figure 6:
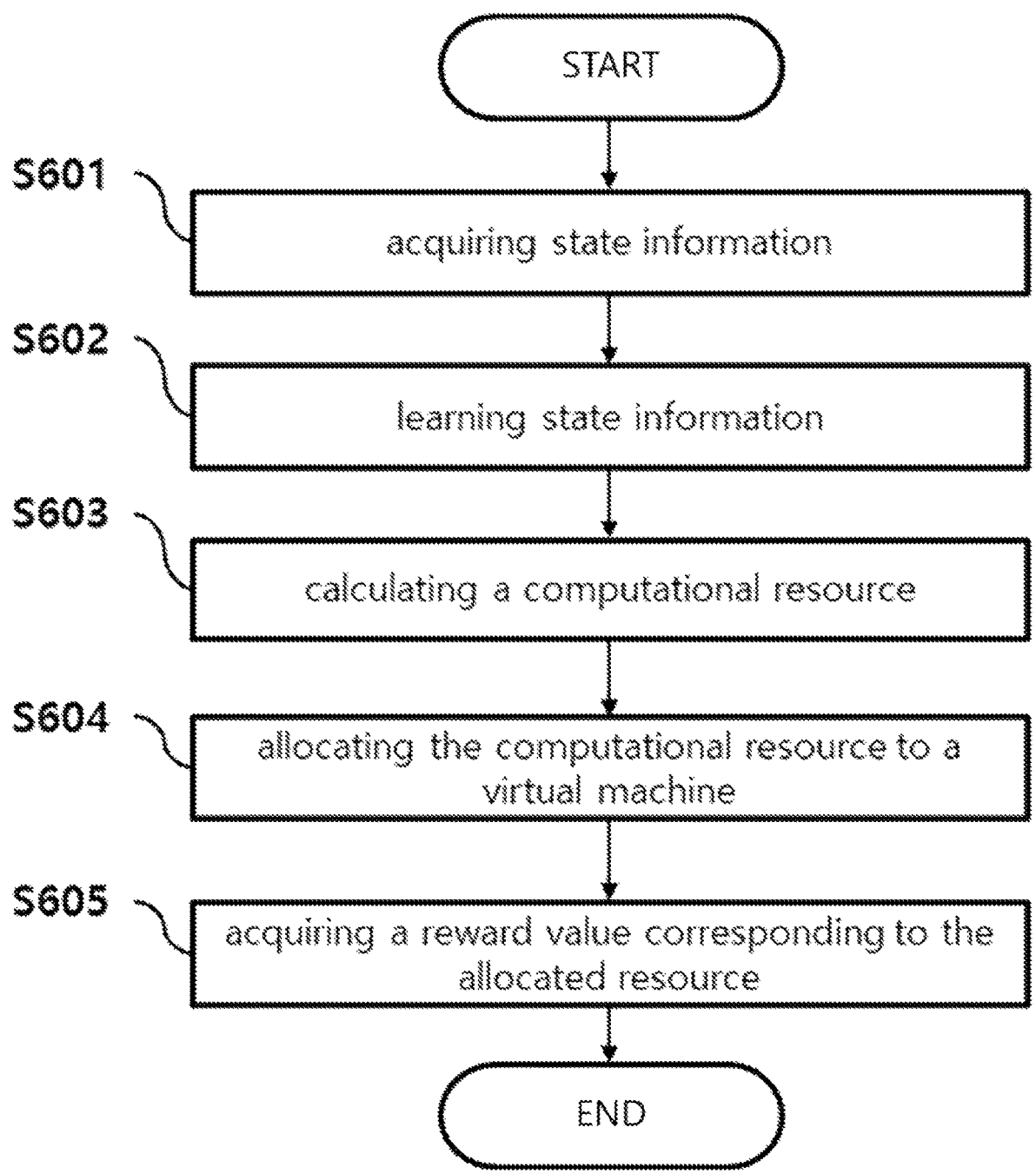
FIG. 6 is a flowchart in which a dynamic resource allocation apparatus operates according to an exemplary embodiment.

FIG. 6 is a flowchart in which the dynamic resource allocation apparatus operates according to an exemplary embodiment. The dynamic resource allocation according to an exemplary embodiment may include acquiring state information (S601), learning state information (S602), calculating a computational resource (S603), and allocating the computational resource to a virtual machine (S604). Further, the dynamic resource allocation may further include acquiring a reward value corresponding to the allocated resource (S605).

The acquiring of the state information (S601) is a step of acquiring load information of a remote radio head corresponding to the virtual machine from the virtual machine of the cloud radio access network. In other words, the state information including the load information of the remote radio head may be acquired from the virtual machine.

The learning of the state information (S602) is a step of performing deep reinforcement learning by using the acquired state information. An algorithm of the deep reinforcement learning is described in detail in FIG. 4.

The calculating of the computational resource (S603) is a step of calculating the computational resource required for each virtual machine based on learned contents. The required computational resource is changed depending on the user load which of the remote radio head corresponding to each virtual machine, which is dynamically changed. Accordingly, the calculating of the computational resource is a step of predicting and calculating the changed computational resource.

The allocating of the computational resource to the virtual machine (S604) is a step of allocating the computational resource calculated in step S603 to each virtual machine. The allocation of the computational resource may be a method for increasing, decreasing, or maintaining the existing computational resource which is already allocated.

In the acquiring of the reward value (S605), a reward value corresponding to the allocated resource is acquired. In the allocating of the computational resource (S604), a new computational resource is allocated, but when a resource allocation goal is not reached, the reward value may be acquired from the virtual machine and steps subsequent from previous step S602 may be repeatedly performed again.

Meanwhile, in the allocating of the computational resource (S604), the new computational resource is allocated and when the resource allocation goal is reached, the assignment may be terminated.

A deep reinforcement learning based algorithm of dynamically allocating the computational resource to each virtual machine in the baseband unit pool of the cloud radio access network according to an exemplary embodiment is described. The dynamic resource allocation apparatus learns load fluctuation of different remote radio heads and allocates the computational resource according to a load of a connected virtual machine. When the dynamic resource allocation method according to an exemplary embodiment is used, the computational resource may be allocated while minimizing a user demand which is not satisfied and the quantity of wasted resources.

The description of the presented exemplary embodiments is provided so that those skilled in the art use or implement the present invention. Various modifications of the exemplary embodiments will be apparent to those skilled in the art and general principles defined herein can be applied to other exemplary embodiments without departing from the scope of the present invention. Therefore, the present invention is not limited to the exemplary embodiments presented herein, but should be analyzed within the widest range which is coherent with the principles and new features presented herein.

What is claimed is:

1. An apparatus for allocating a dynamic resource, the apparatus comprising:
    a processor configured to:
        learn load fluctuation of a remote radio head by using deep reinforcement learning,
        predict the load fluctuation of the remote radio head;
        calculate a computational resource of a virtual machine corresponding to the remote radio head by using the predicted load fluctuation; and
        allocate the calculated computational resource to the virtual machine,
    wherein the processor is further configured to:
        acquire a reward value from the virtual machine; and
        predict the load fluctuation of the remote radio head by using the reward value,
    wherein the processor is further configured to repeatedly perform learning until a difference value between a required value of the computational resource and an allocation value of the computational resource reaches a predetermined value or less, and
    wherein the processor is further configured to, when there are a plurality of virtual machines, calculate the difference value by adding absolute values of required values of the computational resources for respective virtual machines and the allocation value of the computational resource.

2. The apparatus of claim 1, wherein the processor is further configured to:
    learn the load fluctuation of the remote radio head by using the deep reinforcement learning and
    predict the load fluctuation of the remote radio head.

3. The apparatus of claim 1, wherein the processor is further configured to learn the load fluctuation of the remote radio head by dividing a time domain and predicts the load fluctuation to correspond to the time domain.

4. An operation method of a dynamic resource allocation apparatus, the method comprising:
    (a) learning load fluctuation of a remote radio head by using deep reinforcement learning and predicting the load fluctuation of the remote radio head;
    (b) calculating a computational resource of a virtual machine corresponding to the remote radio head by using the predicted load fluctuation;
    (c) allocating the calculated computational resource to the virtual machine;
    (d) acquiring a reward value from the virtual machine and predicts the load fluctuation of the remote radio head by using the reward value,
    wherein the predicting of the load fluctuation of the remote radio head by using the reward value is repeatedly performed until a difference value between a required value of the computational resource and an allocation value of the computational resource reaches a predetermined value or less, and
    wherein when there are a plurality of virtual machines, the difference value is calculated by adding absolute values of required values of the computational resources for respective virtual machines and the allocation value of the computational resource.

5. The method of claim 4, wherein in the predicting of the load fluctuation, the load fluctuation of the remote radio head is learned by dividing a time domain and the load fluctuation is predicted to correspond to the time domain.

* * * * *